United States Patent [19]

Babjak

[11] 4,320,099
[45] Mar. 16, 1982

[54] PROCESS FOR NICKEL REMOVAL FROM CONCENTRATED AQUEOUS COBALTOUS SULFATE SOLUTIONS

[75] Inventor: Juraj Babjak, Mississauga, Canada
[73] Assignee: Inco Limited, Toronto, Canada
[21] Appl. No.: 172,670
[22] Filed: Jul. 28, 1980
[51] Int. Cl.³ .................... B01D 11/00; C01G 51/00; C22B 1/00
[52] U.S. Cl. ................................................. 423/139
[58] Field of Search ...................... 423/139, DIG. 14; 75/101 BE

[56] References Cited

U.S. PATENT DOCUMENTS 3,998,924  12/1976  Jones .................................. 423/139
4,098,867  7/1978  Grinstead ........................... 423/139

OTHER PUBLICATIONS

Marcus & Kertes *Ion Exchange and Solvent Extraction of Metal Complexes* John Wiley & Sons, Ltd. (1969) pp. 277-279.

Primary Examiner—Brian E. Hearn
Attorney, Agent, or Firm—Raymond J. Kenny; Ewan C. MacQueen

[57] ABSTRACT

By contacting an aqueous cobaltous sulfate solution with an ion-exchange resin having bis—(2-picolyl)amine functional groups nickel is removed down to very low levels.

4 Claims, 1 Drawing Figure

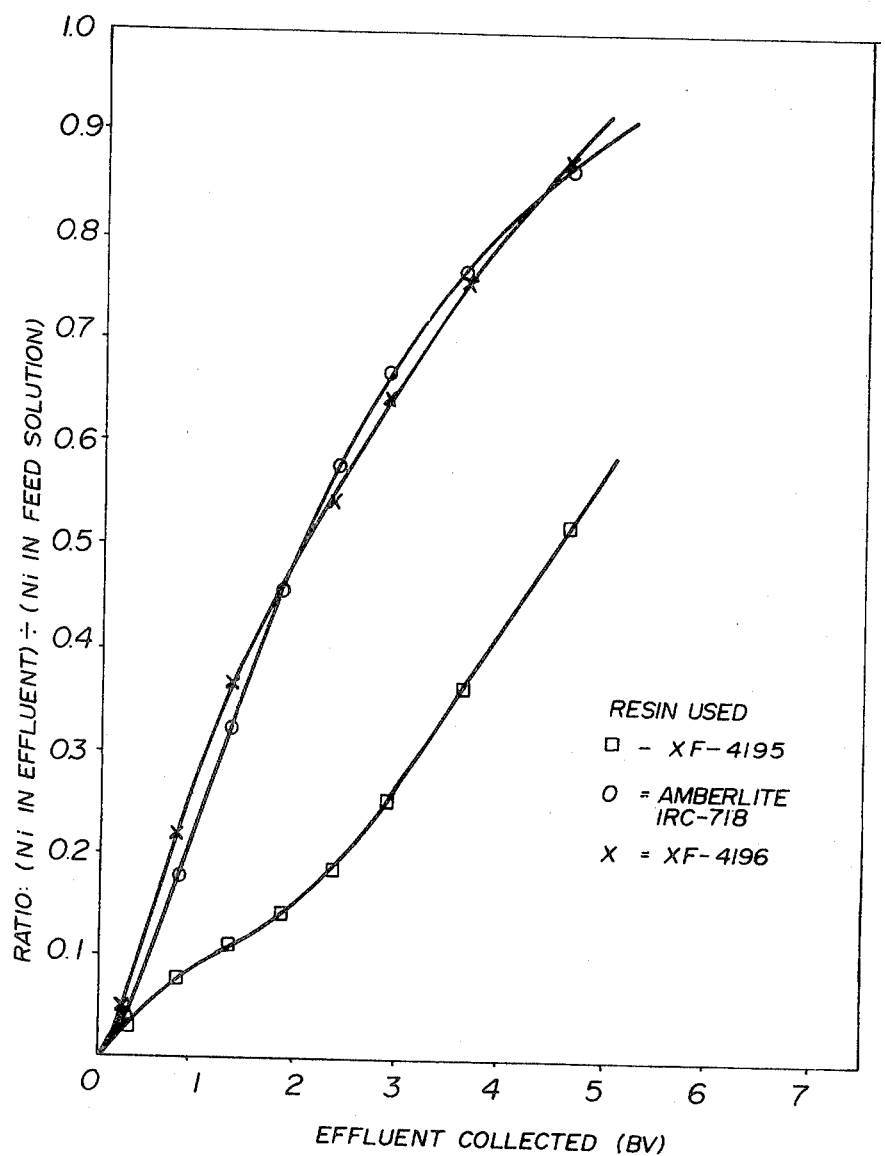

PROCESS FOR NICKEL REMOVAL FROM CONCENTRATED AQUEOUS COBALTOUS SULFATE SOLUTIONS

FIELD OF THE INVENTION

The present invention relates to the purification of aqueous cobaltous solutions, and in particular to the removal of nickel from such solutions down to very low levels.

BACKGROUND OF THE INVENTION

In many hydrometallurgical processes for recovering nickel and cobalt from their sulfidic or oxidic ores, intermediate aqueous process streams are generated which contain dissolved nickel and cobalt. In order to produce high purity cobalt from such solutions it is necessary to remove the nickel therefrom down to very low levels. For example, cobalt products are desired, the purity of which is such that the cobalt to nickel ratio is of the order of 1000 to 1. If such cobalt is to be produced from the purified solution, by hydrogen reduction for example, the solution itself must exhibit a purity of Co:Ni > 1000:1 if the desired product purity is to be achieved. It would be particularly advantageous to be able to use an ion exchange procedure for purifying the cobalt-containing solutions.

Many ion exchange resins available commercially are said to exhibit some selectivity between nickel and cobalt, i.e., nickel will load more readily than cobalt into such resins. The selectivity indicated by the published literature for such resins is of a smaller degree than that which is achievable between more dissimilar metal pairs, such as nickel and copper or nickel and zinc. Nevertheless, some of the resins which have been developed in recent years would seem capable of being applied to the task of cobalt solution purification. Selection of any resin is in practice based primarily on the Ni/Co selectivity factor quoted for such resin, or calculable from the quoted data. The selectivity factor, $S_{Ni/Co}$, is defined as the ratio of distribution coefficients $D_{Ni}$ and $D_{Co}$, each of which in turn is the ratio of the concentration of metal in the resin and in an aqueous solution in equilibrium therewith. Thus the selectivity factor can be expressed as:

$$S_{Ni/Co} = \frac{D_{Ni}}{D_{Co}}$$

$$S_{Ni/Co} = \frac{[Ni]_r \times [Co]_a}{[Ni]_a \times [Co]_r}$$

wherein $[\ ]_r$ refers to the metal concentration in the resin, and $[\ ]_a$ refers to the metal concentration in the aqueous phase in equilibrium therewith.

In the case of some of recently developed resins, the Ni/Co selectivity can be estimated from selectivity published for each of these two metals with respect to a common reference, typically calcium. When the claimed selectivity is examined in this way, the most promising of commercial resins would seem to be a chelating resin having aminocarboxylic acid functional groups, available from Rohm and Haas under the name: Amberlite* IRC718. The selectivity factor for this resin is indicated by the manufacturer's trade literature as being 54.4 (evaluated from selectivity factors of 3100 and 57 quoted for nickel and cobalt, respectively, with respect to calcium). Indeed the use of such a resin for selective recovery of nickel and cobalt from aqueous solutions is the subject of U.S. Pat. No. 4,123,260 issued on Oct. 31, 1978 to Sefton and Kofluk.

*Trademark

It has now been found, however, that resins of the aminocarboxylate type are not capable of removing nickel effectively from concentrated cobaltous solution. Specifically, it was determined that the selectivity exhibited by a resin such as Amberlite IRC718 is lower (by as much as an order of magnitude) in the presence of concentrated aqueous cobaltous solutions, than the value indicated by the published literature, which value is probably related to resin performance in the presence of dilute solutions such as effluent streams from which small amounts of Ni or Co are to be removed.

OBJECT OF THE INVENTION

The present invention aims at providing a method whereby substantially all of the nickel can be efficiently removed from aqueous cobaltous sulfate solutions containing about 50 grams per liter (g/l) or more of cobalt in solution.

BRIEF DESCRIPTION OF THE DRAWING

The accompanying drawing consists of curves showing nickel removal from a solution of high cobalt content using two ion exchange resins outside the invention and one ion exchange resin within the invention (XF-4195) expressed as the ratio of the nickel content of the effluent fraction to the nickel content of the feed solution plotted against bed volumes (B.V.) of resin.

SUMMARY OF THE INVENTION

According to the invention a process is provided for removing nickel from an aqueous cobaltous sulfate solution which contains dissolved nickel and at least about 50 g/l of dissolved cobalt, comprising adjusting the pH of the solution if necessary to a value between about 2 and 6, and contacting the solution at a temperature of about 20°–60° C. with a chelating ion-exchange resin having bis(2-picolyl)amine functional groups to selectively load nickel onto the resin and produce a purified solution from which high purity cobalt can be recovered.

A commercial resin which can be used for this purpose is available from Dow Chemicals under the name: XF-4195. The effectiveness of this resin in the process of the invention is particularly surprising in view of the poor selectivity indicated by the published data therefor. Thus data published for nickel and cobalt absorption by this resin suggest a selectivity factor of only 6.3, i.e., it would appear to be far less selective than the Amberlite IRC718 resin. Yet it was found that, for reasons which are by no means clear, the measured selectivity in the presence of concentrated aqueous cobaltous solutions is not predictable from the published data relating to behavior with dilute solutions. Indeed the measured selectivity of Dow's XF-4195 resin was found to be four to five times greater than the value calculated for dilute solutions, whereas the selectivity of the Amberlite IRC718 resin was found to be about ten times smaller than its respective dilute solution value.

The purification process can be carried out in any conventional manner including use of a fixed bed or a moving bed of resin, and the solution can be processed in either of batch or continuous modes of operation. While the process may be carried out at room temperature, we prefer for kinetic reasons to maintain the resin bed at about 50°-60° C. The solution pH is preferably adjusted to between 4.5-5.5 for best results. Under such conditions we have found it possible to achieve purification so as to produce solutions wherein the cobalt to nickel ratio exceeds 1000.

The invention will now be specifically described by way of examples.

EXAMPLE 1

Four series of tests were carried out using Dow's XF-4195 resin to purify solutions having cobalt contents ranging from 49 to 127 g/l. In each series of tests the feed solution was a synthetic sulfate solution having a fixed cobalt content, containing about 50 g/l of sodium sulfate and varying amounts of nickel between 0.19 to 1.5 g/l. Each test was a batch test wherein the solution pH was adjusted to 2.0 at 50° C., mixed with resin in a phase ratio (solution/resin) of 10 and maintained in agitated contact with the resin at 50° C. for a 24 hour duration. At the end of that time the distribution of nickel and cobalt between the phases was determined by assaying the phases. Table 1 below shows the results determined in the first series of tests, wherein the feed solution contained 49.3 g/l of cobalt.

TABLE 1

| Analysis of Equilibrated Phases (g/l) | | | | |
|---|---|---|---|---|
| Aqueous | | Resin | | |
| Ni | Co | Ni | Co | $S_{Ni/Co}$ |
| 0.095 | 46.2 | 1.79 | 31.3 | 27.8 |
| 0.170 | 46.2 | 3.19 | 30.6 | 28.4 |
| 0.278 | 46.44 | 4.37 | 28.6 | 25.5 |
| 0.370 | 46.44 | 5.29 | 28.6 | 23.2 |
| 0.545 | 46.66 | 7.75 | 26.4 | 25.1 |
| 0.675 | 46.67 | 9.69 | 26.3 | 25.4 |

The three other series of tests were carried out with initial solutions containing 74, 97.8 and 127 g/l of cobalt respectively. Table 2 below provides by way of summary, the average value of $S_{Ni/Co}$ determined from the six tests of each series.

TABLE 2

| Co in Aqueous Feed (g/l) | Average $S_{Ni/Co}$ |
|---|---|
| 49.3 | 28.9 |
| 74 | 25.7 |
| 97.8 | 25.3 |
| 127 | 33.2 |

The above results clearly show that good selectivity can be obtained throughout the cobalt concentration range tested. The average selectivity factors determined are to be contrasted with the value of 6.3 suggested by available data for the resin.

EXAMPLE 2

By way of comparison two further series of batch tests were carried out in which it was attempted to purify concentrated cobaltous solutions with different resins. In each series five tests were conducted with initial solutions wherein the cobalt content was 96.6 g/l in all cases, and the nickel content was, respectively, 0.25, 0.5, 0.75, 1.0 and 1.25 g/l. Each test involved a contacting time of 24 hours as in the case of Example 1, the pH in this case was 2.5 and the temperature 60° C. The first series of these comparative tests, the results of which are shown in Table 3 below, were carried out using the Amberlite IRC-718 resin. The second series of tests were conducted with another resin of the same type commercially available from Bayer A.G. under the name Lewatit* TP207, and the results obtained are given in Table 4.

*Trademark

TABLE 3

| Analysis of Equilibrated Phases (g/l) | | | | |
|---|---|---|---|---|
| Aqueous | | Resin | | |
| Ni | Co | Ni | Co | $S_{Ni/Co}$ |
| 0.27 | 91.2 | 0.83 | 54.2 | 5.22 |
| 0.43 | 91.4 | 1.36 | 52.2 | 5.60 |
| 0.63 | 91.4 | 1.88 | 51.9 | 5.28 |
| 0.79 | 92.0 | 2.21 | 45.9 | 5.61 |
| 1.16 | 92.6 | 3.45 | 40.0 | 6.96 |

TABLE 4

| Analysis of Equilibrated Phases (g/l) | | | | |
|---|---|---|---|---|
| Aqueous | | Resin | | |
| Ni | Co | Ni | Co | $S_{Ni/Co}$ |
| 0.20 | 89.8 | 0.98 | 67.9 | 6.48 |
| 0.36 | 89.7 | 1.71 | 69.4 | 6.14 |
| 0.52 | 90.1 | 2.45 | 65.2 | 6.49 |
| 0.68 | 90.6 | 3.39 | 60.3 | 7.51 |
| 0.98 | 89.7 | 4.58 | 68.5 | 6.21 |

It will be seen from the results of Table 3 and 4 that neither of the resins: Amberlite IRC-718 and Lewatit TP207 exhibits a selectivity in the presence of concentrated cobaltous solutions comparable to that which the bis(2-picolyl)amine resin was found to exhibit.

EXAMPLE 3

A sulfate solution containing 50 g/l Co and 14.3 g/l Ni was treated with the XF-4195 resin in a column wherein 1.3 l of resin were contained as a bed 4.2 cm in diameter and 91 cm deep. The solution, which had a pH of 5.0 was made to flow upwards through the column at the rate of 1 cubic meter per hour per square meter of column cross section ($m^3/m^2/h$) and the bed was maintained at 50° C. The effluent exiting from the column was analyzed for cobalt and nickel and Table 5 below shows the assays of fractions of effluent collected as the test progressed. The fractions are expressed in multiples of the resin bed volume (BV).

TABLE 5

| Effluent fraction collected (Bv) | Effluent Assay g/l | | Co/Ni ratio in fraction |
|---|---|---|---|
| | Co | Ni | |
| 0 to 0.5 | 0.001 | 0.001 | — |
| 0.5 to 0.7 | 0.001 | 0.001 | — |
| 0.7 to 0.8 | 0.001 | 0.001 | — |
| 0.8 to 0.9 | 5.86 | 0.001 | 5860 |
| 0.9 to 1.0 | 47.3 | 0.001 | 47300 |
| 1.0 to 1.1 | 58.0 | 0.002 | 29000 |
| 1.1 to 1.2 | 60.5 | 0.005 | 12100 |
| 1.2 to 1.3 | 62.0 | 0.013 | 4769 |
| 1.3 to 1.4 | 60.0 | 0.052 | 1154 |
| 1.4 to 1.5 | 60.0 | 0.133 | 451 |
| 1.5 to 1.75 | 58.0 | 0.600 | 97 |
| 1.75 to 2.0 | 55.5 | 2.75 | 21 |
| 2.0 to 2.25 | 52.5 | 6.25 | 8.4 |
| 2.25 to 2.5 | 51.0 | 9.50 | 5.4 |
| 2.5 to 2.75 | 50.0 | 11.7 | 4.1 |
| 2.75 to 3.0 | 50.5 | 12.5 | 4.0 |
| 3.0 to 3.5 | 50.0 | 13.5 | 3.6 |
| 3.5 to 4.0 | 50.0 | 14.25 | 3.5 |

Because of the displacement of hydrogen ions in the resin by metal ions, the loading of the resin with either cobalt or nickel causes a release of hydrogen ions into the aqueous solution. As a result the measured pH of the effluent varied from about 1.5 in the early fractions where substantial loading was taking place to 5.0 after 4 BV had been collected. It is clear from Table 5 that even the very high nickel content present in the initial solution (in which the Co/Ni ratio was about 3.5) up to 4 BV of effluent were collected before "breakthrough" was evidenced by an effluent composition corresponding to that of the aqueous feed.

EXAMPLE 4

Three column tests were conducted with a sulfate solution assaying about 100 g/l Co, 1.16 g/l Ni and having a pH of 6.3 measured at 22° C. In each case the solution was passed through a 0.8 m long resin bed at the rate of 3 m³/m²/h, and the bed temperature was 50° C. One of the resin beds contained the XF-4195 resin referred to in Examples 1 and 3. The second bed contained the Amberlite IRC-718 resin referred to in Example 2, while the third bed contained another recently developed Dow Chemicals resin available commercially under the designation XF-4196 which contains N-(2-hydroxyethyl)-2-picolylamine functional groups. The nickel assay of various effluent fractions collected in the tests is shown in Table 6. The performance of the XF-4196 resin was found to be comparable to that of the Amberlite IRC-718 resin, whereas the results obtained using the XF-4195 resin were vastly superior to both of the other resins.

TABLE 6

| Effluent Fraction Collected (BV) | Ni (g/l) in fraction for test with: | | |
|---|---|---|---|
| | XF-4195 resin | XF-4196 resin | Amberlite IRC-718 resin |
| 0 to 0.5 | 0.043 | 0.058 | 0.045 |
| 0.5 to 1.0 | 0.096 | 0.253 | 0.204 |
| 1.0 to 1.5 | 0.123 | 0.424 | 0.373 |

TABLE 6-continued

| Effluent Fraction Collected (BV) | Ni (g/l) in fraction for test with: | | |
|---|---|---|---|
| | XF-4195 resin | XF-4196 resin | Amberlite IRC-718 resin |
| 1.5 to 2.0 | 0.160 | 0.523 | 0.532 |
| 2.0 to 2.5 | 0.210 | 0.626 | 0.667 |
| 2.5 to 3.0 | 0.290 | 0.747 | 0.773 |
| 3.0 to 4.0 | 0.420 | 0.878 | 0.882 |
| 4.0 to 5.0 | 0.600 | 1.000 | 0.995 |

The results are illustrated graphically in the accompanying drawing which shows a plot of nickel removal as a function of the amount of effluent collected, the nickel removal being expressed in terms of the ratio of the nickel content of the effluent fraction to the nickel content of the feed solution. The drawing clearly shows the superiority of the XF-4195 resin.

The invention has been described with reference to preferred embodiments thereof. It will be understood that various modifications may be made to the details of these embodiments without departing from the scope of the invention which is defined by the appended claims.

What we claim is:

1. A process for removing nickel from an aqueous cobaltous sulfate solution which contains dissolved nickel and at least 50 grams per liter of dissolved cobalt comprising adjusting the pH of the aqueous solution if necessary to a value of between about 2 and 6, and contacting the solution at a temperature of about 20° to 60° C. with a chelating ion-exchange resin having bis(2-picolyl)amine functional groups to selectively load nickel onto the resin and produce a purified solution characterized by a concentration ratio of dissolved cobalt to dissolved nickel which exceeds 200 from which high purity cobalt can be recovered.

2. A process as claimed in claim 1 wherein the pH of the aqueous solution to be treated is adjusted if necessary to 4.5 to 5.5.

3. A process as claimed in claim 1 wherein the aqueous solution is contacted with the resin at a temperature of 50° to 60° C.

4. A process as claimed in claim 1 wherein the relative volumes are selected to ensure that said concentration ratio exceeds 1000.

* * * * *